(12) United States Patent
Schnelle et al.

(10) Patent No.: US 8,825,269 B2
(45) Date of Patent: Sep. 2, 2014

(54) PROCESS FOR THE MONITORING OF VEHICLES OF A MOTOR VEHICLE FLEET

(75) Inventors: Frank Schnelle, Munich (DE); Janus Cogiel, Munich (DE); Bernhard Staudacher, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 43 days.

(21) Appl. No.: 13/605,362

(22) Filed: Sep. 6, 2012

(65) Prior Publication Data

US 2013/0066513 A1 Mar. 14, 2013

(30) Foreign Application Priority Data

Sep. 8, 2011 (DE) .......................... 10 2011 082 361

(51) Int. Cl.
*G01M 17/00* (2006.01)
*G06Q 10/06* (2012.01)

(52) U.S. Cl.
CPC ...................................... *G06Q 10/06* (2013.01)
USPC ........................................................ 701/29.3

(58) Field of Classification Search
CPC ...... G07C 5/008; G07C 5/0808; G07C 5/085; G07C 2205/02; G07C 5/0891
USPC ...................................... 701/29.3, 2, 31.4, 35
See application file for complete search history.

(56) References Cited

U.S. PATENT DOCUMENTS

| | | | | |
|---|---|---|---|---|
| 5,726,885 A | * | 3/1998 | Klein et al. ................. | 455/456.6 |
| 2005/0203683 A1 | * | 9/2005 | Olsen et al. ...................... | 701/35 |
| 2006/0049925 A1 | * | 3/2006 | Hara et al. ..................... | 340/435 |
| 2012/0253862 A1 | * | 10/2012 | Davidson ..................... | 705/7.11 |
| 2013/0032169 A1 | * | 2/2013 | Calluiere et al. .................. | 134/6 |

FOREIGN PATENT DOCUMENTS

| | | |
|---|---|---|
| DE | 695 19 555 T2 | 7/2001 |
| DE | 10 2006 023 646 A1 | 11/2007 |
| EP | 0 698 864 B1 | 9/1999 |

OTHER PUBLICATIONS

German Search Report dated Jan. 30, 2012 with partial English translation (ten (10) pages).

* cited by examiner

*Primary Examiner* — Helal A Algahaim
*Assistant Examiner* — Shardul Patel
(74) *Attorney, Agent, or Firm* — Crowell & Moring LLP

(57) ABSTRACT

In a process for monitoring motor vehicles of a motor vehicle fleet which is operated by a fleet operator, by way of a sensor system in the respective vehicle of at least a part of the vehicle fleet, vehicle-related data of the vehicle are determined. The vehicle-related data includes at least its geographical position. By use of at least a portion of the vehicle-related data, a number of servicing parameters are determined, which describe the service requirement of the respective vehicle. By using a data network, by way of which the respective vehicle and a user interface assigned to the fleet operator communicate, the number of servicing parameters and the geographical position of the respective vehicle are output by way of the user interface.

18 Claims, 1 Drawing Sheet

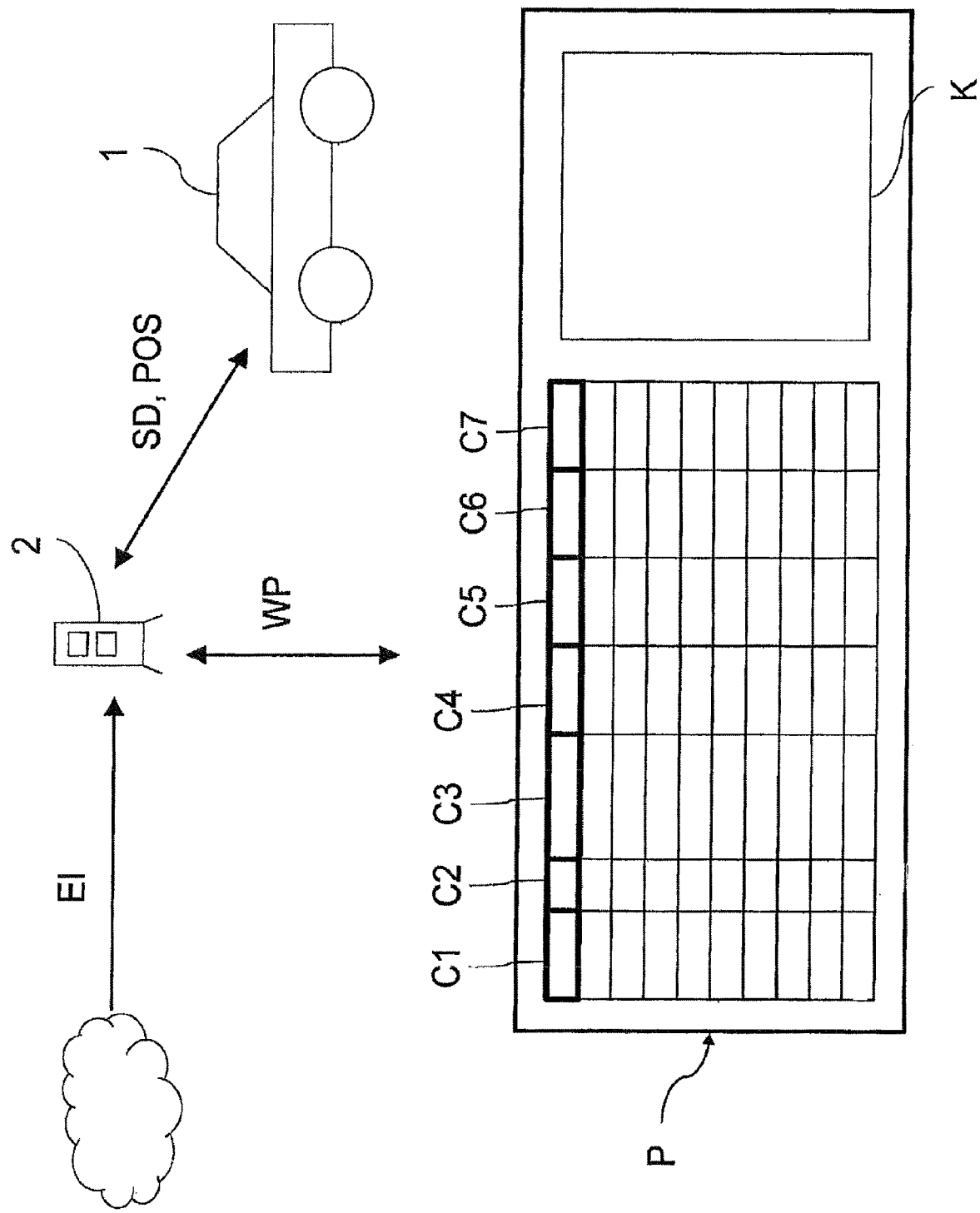

PROCESS FOR THE MONITORING OF VEHICLES OF A MOTOR VEHICLE FLEET

CROSS REFERENCE TO RELATED APPLICATION

This application claims priority under 35 U.S.C. §119 from German Patent Application No. 10 2011 082 361.1, filed Sep. 8, 2011, the entire disclosure of which is herein expressly incorporated by reference.

BACKGROUND AND SUMMARY OF THE INVENTION

The invention relates to a process and system for monitoring motor vehicles of a motor vehicle fleet, which fleet is operated by a fleet operator.

For the management of a motor vehicle fleet by a fleet operator, it is indispensable that the vehicles of the fleet are serviced at regular intervals, so that there will be no breakdowns during operation when the vehicles are rented. Furthermore, it should be ensured that a servicing of the vehicles also takes place in such a manner that the body shell and the interior of the vehicle are in a condition that is as clean as possible in order to thereby achieve a high acceptance by renters and a frequent renting of the vehicles.

For the servicing of the motor vehicles of a vehicle fleet, it is currently necessary that the vehicles be seen at their locations at regular intervals by a service technician. The service technician checks the servicing requirement and subsequently carries out the servicing, if necessary. This process and system requires considerable manual effort.

It is therefore an object of the invention to develop a process and a system for monitoring vehicles of a motor vehicle fleet, by which the expenditures in connection with the servicing of the vehicles are reduced.

This and other objects are achieved by a process and system for monitoring motor vehicles of a motor vehicle fleet which is operated by a fleet operator, wherein, for a respective vehicle, of at least a part of the motor vehicle fleet, by way of a sensor system in the respective vehicle, vehicle-related data of the vehicle are determined. The vehicle-related data comprises at least its geographical position. By at least a portion of the vehicle-related data, a number of servicing parameters are determined, which describe the service requirement of the respective vehicle. By using a data network, by way of which the respective vehicle and a user interface assigned to the fleet operator communicate, the number of servicing parameters and the geographical position of the respective vehicle are output by way of the user interface.

Within the scope of the process according to the invention, vehicle-related data of the vehicle are determined for a respective vehicle of at least a part of the motor vehicle fleet by way of a sensor system in the respective vehicle, the vehicle-related data comprising at least the geographical position of the vehicle. The term "vehicle-related data" should be understood in a broad sense and, in addition to the geographical position, may also concern other vehicle-related data or condition data of the vehicle, in which case the embodiments of such condition data will be described further below. By means of at least a portion of the vehicle-related data, which, as required, does not have to include the geographical position of the vehicle, a number of servicing parameters are determined, which describe the service requirement of the respective vehicle. In this case, additional information, which does not originate from the vehicle, may possibly also be included in the determination of the servicing parameters.

According to the invention, by using a data network, by way of which the vehicle and a user interface assigned to the fleet operator communicate, the number of servicing parameters and the geographical position of the respective vehicle are output by way of the user interface. The process thereby permits an automated determination of corresponding vehicle-related data and of servicing parameters derived therefrom, which are provided to the vehicle operator by way of a data network. It is therefore no longer necessary that the servicing requirement of the individual vehicles is manually determined by service technicians. The vehicle-related data are preferably determined over a longer time period, particularly starting at the point-in-time of the last servicing, so that also the servicing parameters are determined, as required, based on vehicle-related data from a longer time period.

In a particularly preferred embodiment, the data network, by way of which the vehicle and the user interface communicate, comprises the Internet, so that the corresponding vehicle information can be transmitted to user interfaces at arbitrary locations. In a preferred variant, the vehicle is linked to the data network by way of a wireless interface, preferably a mobile radio interface. As a result, the servicing parameters can be retrieved for almost any arbitrary location of the vehicle.

In a variant of the process according to the invention, the vehicle-related data are transmitted from the respective vehicle to a central computer which, by means of at least a portion of the vehicle-related data, determines at least partially the number of servicing parameters. This means that the computation of the corresponding servicing parameters does not take place in the vehicle itself but is taken over by a central computer, such as a backend server, which communicates with the vehicle via the Internet. As an alternative or in addition, it is also possible, however, that the respective vehicle determines from at least a portion of the vehicle-related data at least partially the number of servicing parameters and transmits them into the data network. In this case, it is not necessary that computations of servicing parameters are carried out by additional computers in the data network.

As mentioned above, for determining the number of servicing parameters, as required, also external information that does not originate in the vehicle, such as weather data, can be taken into account, as mentioned in detail below. Depending on the application case, the number of servicing parameters may also have a different setup. It is essential in this case that the servicing parameters contain information on the servicing requirement of the vehicle. In particular, the servicing parameters may indicate which servicing measures have to be carried out at the time and/or in a predetermined future time period.

The vehicle-related data, which are determined by a sensor system of the respective vehicle, include, in addition to the geographical vehicle position, preferably one or more of the following items:
(1) the condition of one or more operating devices in the vehicle, particularly the tank fill-up condition and/or the engine oil level, the cooling water level, the tire inflation pressure, the filling condition of the window washing system;
(2) the state of charge of the onboard battery of the vehicle;
(3) the mileage of the vehicle;
(4) the state of wear of one or more components in the vehicle, particularly the state of wear of the brakes;
(5) sensor data of a rain sensor of the vehicle;

(6) data concerning the activity of the window wiper of the vehicle;
(7) data concerning the condition of the air conditioner of the vehicle;
(8) data concerning the atmospheric pressure and/or the ambient temperature at the location of the vehicle;
(9) data concerning the sound propagation in the interior of the vehicle which originate from an antitheft warning system;
(10) image data of the vehicle body shell which are acquired by a camera system of the vehicle.

Depending on the application case, all these data can be used in a suitable manner for determining corresponding servicing parameters. For example, with respect to the condition of the operating devices, it can be output as a servicing parameter whether a requirement exists for filling up the operating devices or how high the amount of this requirement is. Additional examples will be described below as to how the just indicated items can be processed within the scope of the determination of servicing parameters.

In a preferred embodiment of the process according to the invention, the degree of soiling of the vehicle body shell is determined as one of the servicing parameters by means of at least a portion of the vehicle-related data of the respective vehicle, in which case, the geographic position of the vehicle preferably also has some influence on the determination of the degree of soiling.

In a preferred variant, one or more of the following items have some influence on the determination of the degree of soiling of the vehicle body shell:
(1) image data of the vehicle body shell, which image data are acquired by a camera system of the vehicle;
(2) sensor data of a rain sensor in the vehicle by which it can be determined whether the vehicle was heavily soiled by rain or snow;
(3) data concerning the activity of the window wiper system of the vehicle from which a conclusion can be drawn as to whether the vehicle was considerably exposed to rain or snow;
(4) data concerning the atmospheric pressure and/or the ambient temperature at the location of the vehicle, which also permit conclusions concerning the soiling of the vehicle.

In a particularly preferred embodiment, it is determined by way of the geographical position of the vehicle in which location category out of a plurality of location categories influencing the degree of soiling the vehicle is situated. In this case, the location categories can be classified such that they relate to whether the vehicle is parked under a roof or in a parking garage, whether it is on a street with heavy traffic or a street with less traffic, or whether it is parked in an identified parking area. These location categories undoubtedly have a large influence on whether or not the vehicle is more soiled. For example, a vehicle parked in a parking garage will be significantly less soiled than a vehicle that is parked on the side of a street or road with heavy traffic.

In a further aspect of the process according to the invention, weather data are taken into account as external information when determining the degree of soiling of the vehicle body shell, in which case, the weather at the geographical position of the vehicle is determined by means of the weather data. By linking the vehicle position with the weather data, it can very easily be determined to which local weather conditions the vehicle was exposed, from which an informative servicing parameter can in turn be derived concerning the exterior soiling of the vehicle.

In a further variant of the process according to the invention, by means of at least a part of the vehicle-related data of the respective vehicle, the degree of soiling of the interior of the vehicle is determined as one of the servicing parameters. In this case, preferably data concerning the sound propagation in the interior of the vehicle, which originate from an antitheft warning system, also have some influence. The antitheft warning system emits sound waves (for example, ultrasound waves) in order to determine the forced entry by persons into the interior of the vehicle. Here, the reflection behavior or the transit time of the sound waves is analyzed. This information can also be utilized for determining the soiling of the interior because, if the soiling is increased, the reflection of the sound waves or their transit time will also change.

The number of servicing parameters determined by means of the process according to the invention as well as the geographical position of the respective vehicle can be represented in different fashions by way of the user interface. These data are preferably displayed on a visual user interface, in which case the assignment of the number of servicing parameters of the respective vehicles to their geographical positions is preferably visualized based on a road map.

In a further development of the process according to the invention, the user interface is further developed such that the user can block or restrict respective vehicles from being further rented. It will thereby be prevented that a vehicle with a high servicing requirement will continue to be used by the user. It is further ensured that a service technician has access to the vehicle for carrying out the servicing and that this vehicle has not been otherwise rented in the meantime.

In addition to the above-described process, the invention also relates to a system for monitoring vehicles of a motor vehicle fleet which is operated by a fleet operator. This system comprises:
(a) a device for providing vehicle-related data of a respective vehicle of at least a part of the motor vehicle fleet, in which case the vehicle-related data comprise at least the geographical position of the vehicle and are determined by way of a sensor system in the respective vehicle;
(b) a device for determining a number of servicing parameters, which describe the servicing requirement of the respective vehicle, by means of at least a portion of the vehicle-related data;
(c) a user interface assigned to the fleet operator, which is further developed such that, by using a data network, by way of which the respective vehicle and the user interface communicate, the number of servicing parameters and the geographical position of the respective vehicle are output by way of the user interface.

In this respect, the system according to the invention is preferably further developed such that one or more preferred embodiments of the process according to the invention can be implemented by means of the system.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a schematic view which explains the process sequence of an embodiment according to the invention.

DETAILED DESCRIPTION OF THE DRAWING

The process begins with a vehicle fleet of motor vehicles which are made available to a plurality of registered users for payment-based use. In this case, the vehicles can be used by the registered user in a specific central business district, for example, in the city center of a larger city, wherein the respective user authenticates himself by way of an authentication unit on the vehicle and thereby receives access to the vehicle, so that he can subsequently use this vehicle for trips. During the use, trip-related data are acquired by the vehicle and are transmitted via a telematics unit to the fleet operator who, on the basis of the trip-related data, will bill the vehicle use to the user. In this case, the vehicles have a GPS navigation system by which their geographical location is determined, which is transmitted by way of the telematics unit to the fleet operator so that the latter will know at which locations the vehicles are located.

When operating such vehicle fleets, it has been found to be problematic that service technicians of the operator have to regularly visit the vehicles based on the known geographical positions in order to check whether there is a servicing requirement at the vehicle. In addition to the purely technical servicing requirement, this servicing requirement comprises also the care of the vehicle, i.e. the cleaning of its interior and of the body shell of the vehicle. If a servicing of the vehicle is required, the service technician will carry out the servicing. For example, he drives the vehicle through the carwash system or replenishes the operating fluid or takes the vehicle to a technical inspection site. The manual checking of the servicing requirement at a vehicle is connected with high expenditures within the scope of the operation of the vehicle fleet.

As a result of the embodiment of the invention, which will be described in the following by means of FIG. 1, the manual servicing expenditures can clearly be reduced. A corresponding rental vehicle of the vehicle fleet is indicated by reference number 1. In a manner known per se, the vehicle includes a GPS module by way of which it can determine its geographical location by satellite-supported position finding. Furthermore, the vehicle contains a corresponding sensor system by which, in addition to the GPS position, it can also acquire further vehicle-related data. Among others, these data may include the condition of the operating devices in the vehicle, as, for example, the fuel tank fill-up condition, the engine oil level, the brake fluid level, the level of the window washing system, and the like. Further examples of such vehicle-related data is information concerning the wear of components in the vehicle, such as the wear of the brakes, the data of a rain/light sensor of the vehicle, image data of a camera system provided on the vehicle, as well as the activity duration of the vehicle window wipers. By way of the rain/light sensor, it can be determined how frequently and heavily rain has occurred during a past time period which, in turn, influences the soiling of the vehicle. The soiling of the vehicle can be determined by means of the camera system at the vehicle, by way of which the rear area and the lateral area of the vehicle shell can be detected.

Within the scope of the embodiment described here, the vehicle-related data determined in the vehicle are sent to a central computer 2 by way of a mobile radio interface, which central computer 2 is part of the backbone network and therefore part of the Internet. In FIG. 1, the vehicle-related data are indicated by means of the reference symbol SD (SD=sensor data), these data also comprising the geographical position of the vehicle which is again separately indicated by the reference symbol POS. The computer 2 is a backend server, which is operated by the vehicle manufacturer and carries out the determination of corresponding servicing parameters described in the following. This backend server, in turn, communicates with a corresponding front end which is assigned to the fleet operator and which has a user interface comprising a monitor, on which a corresponding portal P is displayed by way of an Internet browser, by means of which portal P, a staff member of the fleet operator can manage the vehicles. In this case, there is the possibility that several front ends are provided at different stations of the fleet operator, so that access to information exists from different locations by way of the vehicle fleet.

As mentioned above, the server 2 determines suitable servicing parameters from the transmitted vehicle-related data SD. These servicing parameters describe the servicing requirement of the vehicle. Such a parameter may, for example, convey whether a servicing requirement exists with respect to the filling up of operating devices of the vehicle. In the embodiment described here, the degree of soiling of the vehicle shell is also determined as a servicing parameter, by way of which degree of soiling a conclusion can be drawn whether a servicing requirement exists with respect to a cleaning of the exterior of the vehicle. In this case, external information EI is also taken into account, which may originate from arbitrary third party providers, which is indicated by the symbol of a cloud. In the embodiment according to FIG. 1, the external information includes weather data of a meteorological service. In addition to the weather data, for example, corresponding data of the light/rain sensor or of the camera system of the vehicle can also be used for determining the degree of soiling of the vehicle shell.

The vehicle-related data are preferably collected for a longer time period and are analyzed in the backend server 2, in order to thereby determine the servicing requirement with sufficient precision. The external information may also concern a longer time period. This is particularly relevant when including weather information for determining the degree of soiling of the vehicle. In this case, it is tracked over a longer time period to which weather conditions the vehicle was exposed at its locations in order to thereby determine the soiling of the vehicle in a highly reliable manner.

By use of a suitable algorithm in the server 2, the weather data are compared with the geographical position of the vehicle, from which the weather conditions during a predetermined time period at the geographical position of the vehicle are determined. Should rain, a thunderstorm or hail have occurred, it can be assumed that the degree of soiling of the vehicle, and therefore a service requirement, will be high. The determination of the degree of soiling may possibly also be somewhat influenced by the geographical position such that it is determined by a comparison with a road map at what type of location the vehicle is situated (for example, on the side of a road, in a parking garage, in Zone 30, etc.). If the vehicle is, for example, parked in a parking garage, there would be a lower servicing requirement because the soiling of the vehicle would be much less compared with a position on the side of a heavily traveled road. In a variant of the above-described process, there may, as required, also be the possibility that the soiling of the interior of the vehicle is detected. For this purpose, the information concerning the sound propagation within the vehicle is determined as additional sensor data SD. This information originates from an antitheft warning system of the vehicle which determines by way of ultrasound whether unauthorized persons are attempting to force an entry into the interior of the vehicle. This propagation of sound can be used for determining the amount of the degree of soiling in the vehicle by use of the reflection behavior of the sound or its transit time.

After the determination of the corresponding servicing parameters, the latter are transmitted to the above-mentioned front end, which is assigned to the fleet operator. This transmission is indicated in FIG. 1 by a double arrow, the servicing parameters being indicated by the reference symbol WP. The front end is linked to the Internet, so that information originating from the server 2 can also be received and can be reproduced via the portal P.

As an example, FIG. 1 illustrates a possible reproduction of the servicing parameters via the portal P. This portal P has a table with a plurality of columns C1, C2, . . . , C7 In the top line of the table, which is in bold, it is indicated which type of information is contained in the individual columns. Column C1 relates to the vehicle or the vehicle identification; Column C2 relates to the vehicle type; Column C3 relates to the last updating of the information; Column C4 relates to the mileage of the vehicle; Column C5 relates to the engine oil level of the vehicle; Column C6 relates to the brake fluid level of the vehicle; and Column C7 relates to the degree of soiling of the vehicle. The representation is only an example, and additional columns with corresponding information may also be provided. In the table, the vehicles are preferably arranged in the downward direction according to the urgency of their servicing requirement; i.e. vehicles with a more urgent servicing requirement are listed toward the top in the table.

In the portal P, corresponding vehicles with their servicing requirement are therefore indicated in each line, the servicing requirement being contained in the entries according to the last Columns C5 to C7. In these columns, the servicing requirement is indicated by means of a corresponding color coding of the field of the table. A red color indicates a high servicing requirement; a yellow color indicates a medium servicing requirement; and a green color indicates that there is no servicing requirement. This means that, for Column C5, which relates to the engine oil, the color red indicates that engine oil has to be replenished immediately; whereas the color yellow indicates that the level of engine oil is still acceptable but a speedy replenishment is to be expected. In contrast, a green color indicates that the level of engine oil is all right and that no servicing requirement exists here. In the same manner, the servicing requirement for Column C6 can be indicated for the brake fluid. In Column C7, which relates to degree of soiling of the vehicle, it is indicated by a red color that the vehicle is heavily soiled and should be cleaned as soon as possible; whereas the color yellow represents a medium degree of soiling. The color green indicates, in turn, that the vehicle is only slightly soiled and that there is no servicing requirement with respect to the cleaning of the vehicle.

In addition to the table, the portal P also contains a map K, which is displayed inside the square in FIG. 1 and is only schematically indicated. The map represents at least one area of the business district of the fleet operator in the form of a road map. In the map, it is indicated by means of suitable icons at which locations in the business district the corresponding vehicles are situated, which are contained in the rows of the table.

By use of a suitable filtering function, the vehicles indicated in the portal P are filtered such that only those vehicles are shown which are parked and are not being used by a renter. In this case, it may be possible for the operator of the portal to block vehicles with respect to further rental use; i.e. he can block vehicles with a very high servicing requirement, so that the service technician can visit the corresponding vehicle and carry out the necessary maintenance, which prevents the vehicle from being further rented in the meantime. After a service technician has carried out the corresponding servicing measures, he can, again by way of the portal, which he may call-up, for example, from a mobile device, confirm the implementation of the servicing, whereby the corresponding status of the vehicle changes and the latter can be rented again.

The embodiments of the process according to the invention described above have a number of advantages. In particular, it becomes possible that the servicing requirement of the individual vehicles of a vehicle fleet is determined in an automated manner, without the need for the vehicles to be seen by a service technician for checking the servicing requirement. In this manner, it is ensured that the vehicles are always in a well-maintained and serviced condition, which, in turn, has the result that the vehicles are rented with increasing frequency.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for monitoring motor vehicles in a motor vehicle fleet operated by a fleet operator, the process comprising the acts of: determining, by way of a sensor system in a respective vehicle in the motor vehicle fleet, vehicle-related data concerning the vehicle, the vehicle-related data comprising at least a geographical position of the vehicle; determining, via the geographical position of the vehicle, in which location category of a plurality of location categories influencing the degree of soiling the vehicle is situated; determining a degree of soiling of a body shell of the vehicle based on at least the determined location category; determining, by use of at least a portion of the vehicle-related data, one or more servicing parameters for the respective vehicle, including a service parameter corresponding to the determined degree of soiling of the body shell, the servicing parameters describing a service requirement of the respective vehicle; and outputting, by way of a user interface of the fleet operator, the one or more servicing parameters, including the service parameter corresponding to the determined degree of soiling of the body shell, and the geographical position of the respective vehicle, wherein communication between the respective vehicle and the user interface occurs over a data network.

2. The process according to claim 1, wherein the data network comprises the Internet.

3. The process according to claim 1, wherein the respective vehicle communicates with the data network via a wireless interface.

4. The process according to claim 1, further comprising the acts of: receiving, in a central computer, the vehicle-related data from the respective vehicle, the central computer determining, at least partially, the number of servicing parameters using at least a portion of the received vehicle-related data.

5. The process according to claim 1, wherein the respective vehicle determines from at least a portion of the vehicle-related data at least partially the number of servicing parameters, the respective vehicle transmitting the number of servicing parameters to the data network.

6. The process according to claim 1, wherein, for determining the one or more servicing parameters, factoring into account external information not originating from the respective vehicle.

7. The process according to claim 1, wherein the one or more servicing parameters are indicative of servicing measures to be carried out at that time and/or any predetermined future time period.

8. The process according to claim 1, wherein the vehicle-related data of the respective vehicle comprises at least one of:

(a) a condition of one or more of a fuel tank filled-up condition, an engine oil level, a cooling water level, a tire inflation pressure, and a filling condition of a window washing system;
(b) a state of charge of an onboard battery of the respective vehicle;
(c) a mileage of the vehicle;
(d) a wear state of one or more vehicle components;
(e) sensor data of a rain sensor of the respective vehicle;
(f) data concerning window wiper activity of the respective vehicle;
(g) data concerning a condition of an air conditioner of the respective vehicle;
(h) data concerning atmospheric pressure and/or ambient temperature at a location of the respective vehicle;
(i) data concerning sound propagation in an interior of the respective vehicle, the sound propagation originating from an anti-theft warning system of the respective vehicle; and
(j) image data of a body shell of the respective vehicle acquired via a vehicle camera system.

9. The process according to claim 1, wherein for influencing the determination of the degree of soiling of the body shell of the vehicle, at least one or more of the following are factored into account:
(a) image data of the body shell of the vehicle acquired by a vehicle camera system;
(b) sensor data of a rain sensor of the vehicle;
(c) data concerning window washing system activity of the vehicle;
(d) data concerning atmospheric pressure and/or ambient temperature at a location of the vehicle.

10. The process according to claim 9, wherein, via the geographical position of the respective vehicle, the process determines in which location category of a plurality of location categories influencing the degree of soiling the respective vehicle is situated.

11. The process according to claim 9, wherein weather data at the geographical position of the vehicle are taken into account as external information when determining the degree of soiling of the body shell of the vehicle.

12. The process according to claim 1, wherein, by use of at least a portion of the vehicle-related data of the respective vehicle, a degree of soiling of an interior of the vehicle is determined as one of the one or more servicing parameters.

13. The process according to claim 12, wherein data concerning sound propagation in the interior of the vehicle originating from an anti-theft warning system influence the determining of the degree of soiling of the interior of the vehicle.

14. The process according to claim 1, wherein: the outputting by way of the user interface comprises displaying on a visual user interface the number of servicing parameters and the geographical position of a plurality of respective vehicles; and the visual user interface comprises at least one of a table containing an assignment of the number of servicing parameters to the respective vehicles, and a roadmap containing an assignment of the respective vehicles to the geographic positions of the respective vehicles.

15. The process according to claim 1, further comprising the act of: blocking, by use of the user interface, one or more of the respective vehicles from being provided to customers of the fleet operator.

16. A system for monitoring vehicles in a motor vehicle fleet operated by a fleet operator, the system comprising: a vehicle-related data determining unit for determining vehicle-related data of a respective vehicle in the motor vehicle fleet, the vehicle-related data comprising at least a geographical position of the respective vehicle, wherein the vehicle-related data determining unit further determines, via the geographical position of the vehicle, in which location category of a plurality of location categories influencing the degree of soiling the vehicle is situated, and wherein a degree of soiling of a body shell of the vehicle is determined based on at least the determined location category; a servicing parameter determining unit for determining a number of servicing parameters by use of at least a portion of the vehicle-related data, including a service parameter corresponding to the determined degree of soiling of the body shell, the number of servicing parameters describing a service requirement of the respective vehicle; and a user interface assigned to the fleet operator, the user interface providing an output of the number of servicing parameters, including the service parameter corresponding to the determined degree of soiling of the body shell, and the geographical position of the respective vehicle.

17. A graphical user interface for a fleet operator of a motor vehicle fleet comprising a plurality of motor vehicles, the graphical user interface comprising: a display indicating a number of servicing parameters and a geographical position of one or more respective vehicles in the motor vehicle fleet, wherein the number of servicing parameters, including a service parameter corresponding to a degree of soiling of a body shell of the vehicle, are determined based on vehicle-related data determined via a sensor system in a respective vehicle, the vehicle-related data comprising at least a geographical position of the respective vehicle that is used to determine in which location category of a plurality of location categories influencing the degree of soiling the vehicle is situated, and the number of servicing parameters describing a service requirement of the respective vehicle, and the number of servicing parameters, including the service parameter corresponding to the determined degree of soiling of the body shell, and the geographical position of the respective vehicle are communicated to the user interface via a data network.

18. The graphical user interface according to claim 17, wherein the graphical user interface comprises at least one of a table containing an assignment of the number of servicing parameters to the respective vehicles and a map comprising an assignment of the respective vehicles to their geographical positions.

* * * * *